March 14, 1939.   G. H. DOWTY   2,150,495
TELESCOPIC SHOCK ABSORBER LEG FOR AIRCRAFT UNDERCARRIAGES
Filed Sept. 15, 1937
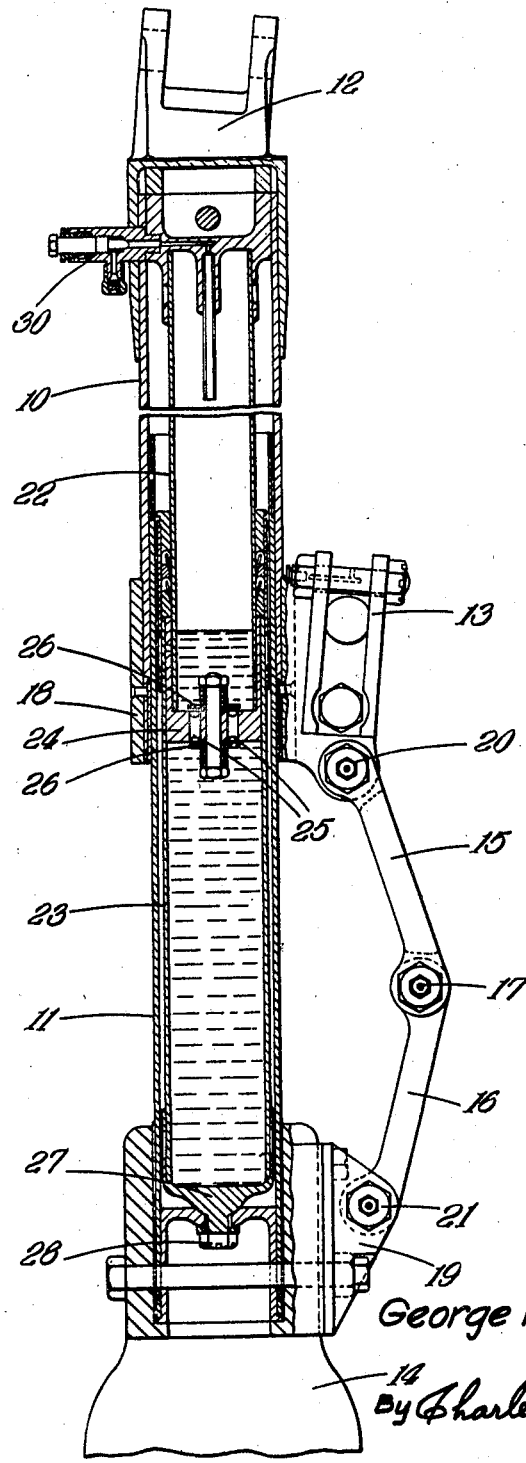
George Herbert Dowty
By Charles L. Reynolds
Attorney Patented Mar. 14, 1939

2,150,495

UNITED STATES PATENT OFFICE 2,150,495

TELESCOPIC SHOCK ABSORBER LEG FOR AIRCRAFT UNDERCARRIAGES

George Herbert Dowty, Cheltenham, England

Application September 15, 1937, Serial No. 163,980
In Great Britain December 1, 1936

14 Claims. (Cl. 267—64)

This invention relates to telescopic shock absorber legs for aircraft undercarriages, and more especially to that type of leg in which the lower part is self-supporting, e. g., in which its telescopically movable part, carrying a wheel or the equivalent, is required to be supported against rotation or torsional stress about the longitudinal axis of the leg. Hitherto it has been proposed to provide a piston and cylinder resilient damping system constituting an undercarriage leg with toggle links arranged like a V and pivoted to each other at the apex and to the cylinder and piston respectively of the damper. The present invention has among its objects the removal of torsional stresses from the shock absorbing means or damping means, so that such means need not be secured against rotation. In known arrangements where the telescoping parts of a shock absorber unit have comprised the load bearing outer members of a leg, the resilience and shock absorbing qualities have been impaired due to binding of the shock absorber unit. Furthermore it has been found impracticable to make such shock absorber units have a long life unless made unduly heavy; it is desirable to provide a shock absorber which is unstressed in torsion or bending.

Having in mind the above desiderata, the present invention consists in the provision, in a telescopic shock absorbing leg, of a telescopic system of tubes sliding within another, interconnected by articulated toggle links for transmitting torque, and in addition a second telescopic system of tubes forming a shock absorbing unit, which by virtue of its construction or attachment, is substantially incapable of transmitting torque. Thus the actual shock absorbing unit can be small in diameter, of light construction, and have simple end attachments, not being required to meet and transmit any substantial torsional stress, i. e. torsion in the system is preferably not transmitted to the shock absorber unit, although if it is, the unit is adapted to yield quite easily, whilst the preferably outer and much more robust telescopic system the parts of which are interconnected against relative rotation by articulated toggle links or the like, receives and meets adequately the torsional stresses, and at the same time is sufficiently and primarily rigid and strong in bending to perform the load-carrying duties of an undercarriage leg. Furthermore the internal shock absorbing unit can be mounted in such a manner as to prevent the unit from carrying bending loads transmitted from the outer case.

In this manner the shock absorber resists or governs only lengthwise movement (compression or extension), and constitutes substantially the sole means within the assembly resisting such loads, but it is relieved of all other loads or stress-resisting functions. The outer or strut system, on the other hand, is relieved of all function to resist compression, but constitutes substantially the sole means in the leg as a whole to resist bending. The interconnection between the tubes of the two systems at one end (called the upper end for convenience) and the interconnection between the tubes at the other or lower end is such that forces tending to bend the outer or strut system can not be effectively transmitted to nor absorbed by the tubes of the shock absorber system, yet the resistance of the latter system to axial movement is transmitted to (but not absorbed by) the former or strut system. Since torque about the axis is resisted preferably by means which are structurally independent of the two systems of tubes, but is transmitted to and absorbed by the outer or strut system, and since the interconnection between the tubes of the two systems is such that torque can not be transmitted to the inner or shock absorber system, it follows that the shock absorber may be designed specifically to resist a single load, compression, and that its design may thereby be made far simpler and lighter than if it had also to resist additional loads, as bending and torsion. Also, the design of the strut system is simplified, since it is not necessary, in contemplating resistance to bending, to take into account any complication arising from the necessity of resisting also torsion and compression. Resistance to torsion need not be considered at all in the design of the strut system, for if it is made sufficiently strong to resist bending, which is in effect its sole function, it will be amply strong to absorb torsional stresses transmitted to it by the associated but structurally independent means employed for that purpose. Each type of stress is therefore, in effect, segregated and resisted by means especially designed and solely employed for that single purpose, and each such means may thereby be made sufficiently strong, yet lighter in each part and in the aggregate, than if it were required to resist compound or multiple stresses.

The invention is illustrated by way of example in the accompanying drawing, which shows a sectional view of a leg including an oleo-pneumatic shock absorbing and damping unit.

The leg comprises an outer telescopic system of tubes 10 and 11 sliding one within the other, and the outer tube 10 carries at its upper end an attachment lug 12 for anchoring the leg to the aircraft (or to retraction means on the aircraft). The leg illustrated is for use in a semi-cantilever undercarriage and for this purpose the tube 10 has a lower attachment lug 13 for the attachment of a bracing strut, which may be a retracting member. The tube 11 carries a fitting shown in part at 14 for carrying the wheel. Toggle links 15 and 16 are articulated to each other at 17, and pivoted respectively to fittings 18 and 19 on the tubes 10 and 11 at 20 and 21. The links 15 and 16 and the attachments to the fittings 18 and 19 are rigid to resist torsion between the ends of the telescopic system. It will be appreciated that a telescopic system is thus provided which is complete in itself in regard to resisting bending and torsion loads sustained in landing and taxiing of the aircraft.

For shock absorbing and damping purposes there is mounted within the telescopic system a telescopic shock absorbing unit and in the drawing this is shown of the oleo-pneumatic kind. The unit may be of any suitable internal construction, and, as shown, comprises an inner tube 22 and outer tube 23 sliding one within the other. The tube 22 is fixed at its upper end to the tube 10 and is closed at its lower end by a wall 24 having fluid passages 25, whilst valves 26 restrain the passage of fluid from one side of the piston to the other for the purpose of damping. The wall 24 forms a piston working in the outer tube 23, and the latter is attached at its lower end to the outer tube 11 of the telescopic system, by a domed pin 27, co-operating with a complementarily domed socket, thereby forming a ball-ended joint. The above fitting is particularly ill-adapted to transmit torque from the telescopic system to the shock-absorbing unit, and the nut 28 may be locked slack on the pin 27 to obviate to a great extent the transmission of such torque. If, in any manner, torque is communicated to the tube 23, it still can not be transmitted to the tube 22, for these two tubes may rotate the one relative to the other. An inflating valve 30 is provided for inflation of the shock-absorbing element.

In some cases the upper end of the shock absorbing unit may be rotatively mounted to the tube 10, the lower end of the shock absorbing unit being fixed within its tube, or both ends may be free to move rotatively, or both the upper and lower end of the shock absorbing unit may be rigidly fixed, i. e., non-rotatably relative to the appropriate parts of the system. In the latter case torsion may be transmitted to the shock absorber unit, but by constructing the unit so that the tubes 22 and 23 are free to rotate relatively to each other, as is preferred and shown, i. e., there is no provision in the unit to prevent or substantially restrain their relative rotation, the unit is not required to transmit torque in the system.

It will be appreciated that many forms of known or convenient kind of shock-absorbing element may be utilized in conjunction with the outer bending and torque resisting system.

What I claim is:

1. A shock-absorbing leg for an aircraft undercarriage comprising a telescopic system of tubes, a pair of links pivotally connected to each other and pivotally connected to tubes of said system for transmission of torque in said system, and a telescopic shock-absorbing unit attached to tubes of said system so as to operate telescopically therewith, one at least of the attachments allowing relative rotation of the unit and the corresponding tube.

2. A shock-absorbing leg for an aircraft undercarriage comprising a telescopic system of two tubes, a pair of pivotally interconnected links pivotally connected to the tubes of the system so as to transmit torsion in said system, and coaxially mounted within said system a shock-absorbing unit rigidly attached at one extremity to the corresponding tube of the system and rotatably attached at the other end to the second tube of said system.

3. A shock-absorbing leg for an aircraft undercarriage as claimed in claim 1 wherein the unit is attached to the system at one end at least by a ball-ended joint.

4. A shock-absorbing leg for a cantilever or semi-cantilever aircraft undercarriage comprising in combination a telescopic system of tubes of which the outer carries means for attaching the leg to the aircraft for transmitting torque from the leg to the aircraft, and of which the inner tube carries a wheel carrying fitting, a pair of links pivotally interconnected to each other and pivotally connected to the tubes of said system to transmit torque in the system, and a telescopic shock-absorbing unit coaxially mounted within the system and attached at one extremity by a ball ended joint to the inner tube of said system, and rigidly attached at its other extremity to the outer tube of said system.

5. A shock-absorbing strut for an aircraft undercarriage or the like, comprising a fitting for attachment to the aircraft structure, a pair of telescoping elements, one non-rotatively secured to the fitting and the other depending from the first, and rotatively supported relative to the latter, a fitting secured non-rotatively to the depending element, whereon to mount a wheel or the like, which in use tends to produce torsion about the longitudinal axis of the telescoping elements, means interconnecting the telescoping elements and structurally independent of the latter, to prevent their relative rotation, while permitting free telescoping movement, and a shock-absorbing unit structurally independent of the telescoping elements, and so interposed between the fittings as to resist compression only between the telescoping elements.

6. The combination of claim 5, wherein the shock-absorbing unit is disposed to act along the axis of the telescoping elements.

7. A shock-absorbing leg or the like for an aircraft undercarriage, comprising a telescopic system of tubes formed, arranged and interconnected to be resistant to bending in various telescoped positions but non-resistant to torsion about its longitudinal axis, constituting a strut, a second and co-axial telescopic system of tubes likewise relatively formed and arranged to be non-resistant to torsion, but resistant to compression, thereby to constitute a shock absorber, means connecting the relatively movable parts of the shock-absorbing system to corresponding parts of the strut, and means structurally independent of but interconnecting the telescopic strut tubes to prevent their relative rotation.

8. A shock-absorbing leg or the like for an aircraft undercarriage, comprising a telescopic system of tubes formed and arranged to be mutually resistant to bending but non-resistant to torsion about its longitudinal axis, and freely movable lengthwise by relative telescoping of the tubes, constituting a strut, a second and coaxial telescopic system of tubes structurally independent of the aforesaid system of tubes, and resistant to compression, thereby to constitute a shock absorber, attaching means connecting one part of the shock-absorbing system to a corresponding part of the strut, a second attaching means connecting a relatively telescopic part of the shock-absorbing system to a corresponding part of the strut, whereby the strut is afforded resistance to relative lengthwise movement of its tubes, the shock-absorbing system, between the two parts of the strut thus connected, being formed and arranged to be non-resistant to torsion, whereby torsion from one strut part cannot be transmitted to another strut part through the shock absorber nor said attaching means, and means interconnecting the telescopic strut tubes to transmit torsion directly from one such tube to another.

9. A shock-absorbing leg for an aircraft undercarriage, comprising a pair of telescopic tubes formed and arranged to resist compression, and constituting a shock absorber, a second pair of tubes formed and arranged to resist bending, and constituting a strut, and disposed coaxially of the shock absorber pair and for telescopic movement relative to one another, one tube of the shock absorber pair being connected to one tube of the strut pair, and the other tube of the shock absorber pair being connected to the other tube of the strut pair, whereby the shock absorber pair constitutes substantially the sole means resisting compression of the assembly, the strut pair being directly interconnected to constitute the primary means resisting bending of the assembly, but their direct connection, and their indirect connection through the shock absorber pair, being non-resistant to relative torsional movement of the strut pair, and means interconnecting the tubes of the strut pair, and constituting substantially the sole means of transmitting torque through the assembly.

10. A shock-absorbing leg for an aircraft undercarriage, comprising a pair of telescopic tubes formed and arranged to resist compression, and constituting a shock absorber, a second pair of tubes constituting a strut, disposed coaxially of and enclosing the shock absorber pair and formed and arranged for telescopic movement relative to one another, one tube of the shock absorber pair being connected to one tube of the strut pair, and the other tube of the shock absorber pair being connected to the other tube of the strut pair, whereby the shock absorber pair constitutes substantially the sole means resisting compression of the asembly, the strut pair being directly interconnected to constitute the primary means resisting bending of the assembly, but their direct connection, and their indirect connection through the shock absorber pair, being non-resistant to relative torsional movement of the strut pair, and pivotally connected links pivotally connected, one to one tube of the strut pair, and one to the other tube of the strut pair, and constituting substantially the sole means of resisting relative rotational movement between parts of the assembly, due to torque.

11. A strut for use upon aircraft or the like, comprising a system of telescoped tubes formed and arranged for free relative rotational and lengthwise movement, but to resist bending, a second system of telescoped tubes disposed in parallel relation to the first, and formed and arranged for free relative rotational and lengthwise movement, means connecting tubes of one system to the correspondingly positioned tubes of the other system for conjoint lengthwise movement of the connected tubes, relatively to the other connected tubes, means associated with the second system, and constituting the sole means, to resist such lengthwise movement in the strut, and means associated with the first system, and constituting the sole means, to resist relative torsional movement between the tubes of the strut.

12. A strut for use upon aircraft or the like, comprising a system of telescoped tubes, including an upper and a lower tube, formed and arranged for free relative rotational and axial movement, but to resist bending, a second system of telescoped tubes, including an upper and a lower tube, disposed coaxially of the first system, and formed and arranged for free relative rotational and axial movement, means connecting the upper tubes and means connecting the lower tubes of each system, for conjoint axial movement of the connected upper tubes relatively to the connected lower tubes, means associated with the second system, and constituting the sole means, to govern such relative axial movement of the strut parts, and means asociated with the first system, and constituting the sole means, to resist relative torsional movement between the strut parts.

13. A strut for use upon aircraft or the like, comprising a system of telescoped tubes, including an upper and a lower tube, formed and arranged for free relative rotational and axial movement, but to resist bending, a second system of telescoped tubes, including an upper and a lower tube, disposed coaxially of the first system, and formed and arranged for free relative rotational and axial movement, means connecting the upper tubes and means connecting the lower tubes of each system, for conjoint axial movement of the connected upper tubes relatively to the connected lower tubes, means associated with the second system, and constituting the sole means, to govern such relative axial movement of the strut parts, and means associated with the first system, and constituting the sole means, to resist relative torsional movement between the strut parts, the means connecting the tubes of the two systems, at one end of the strut, being formed and arranged to permit free relative rotational and angular movement of the tubes thus connected, within limits, whereby the second system of tubes resists only axial stresses, and is relieved of all torsional and bending stress, such latter stresses being wholly assumed by the first system of tubes, and such first system is relieved of all axial stresses.

14. A strut for use upon aircraft or the like, comprising a system of telescoped tubes, including an upper and a lower tube, formed and arranged for free relative axial movement and to resist bending, means connecting said tubes to resist relative rotation thereof, a second system of telescoped tubes, including an upper and a lower tube, disposed coaxially of and within the first system, and formed and arranged for free relative axial movement, means connecting the upper tubes and means connecting the lower tubes of each system, for conjoint axial movement of the connected upper tubes relatively to the connected lower tubes, said connections including elements relatively rotatable, whereby torque about the axis may not be transmitted, through the second system, from the lower tube to the upper tube of the first system, and means associated with the second system to govern relative axial movement of the strut parts.

GEORGE HERBERT DOWTY.